Figure 1:
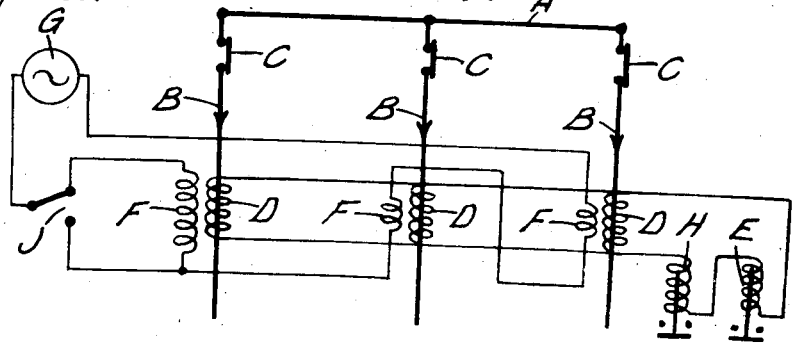

June 10, 1941.  H. LEYBURN  2,244,998
ELECTRIC PROTECTIVE ARRANGEMENT
Filed Oct. 1, 1937  4 Sheets-Sheet 1

At references A, A¹, A² or B the single line represents all three phases.

Inventor,
Henry Leyburn
By. Watson, Coit, Morse
and Grindle
Attys.

Patented June 10, 1941

2,244,998

UNITED STATES PATENT OFFICE 2,244,998

ELECTRIC PROTECTIVE ARRANGEMENT

Henry Leyburn, Newcastle-upon-Tyne, England, assignor to A. Reyrolle & Company Limited, Hebburn-on-Tyne, England, a company of Great Britain Application October 1, 1937, Serial No. 166,884
In Great Britain October 13, 1936

10 Claims. (Cl. 177—311)

This invention relates to electric protective arrangements of the Merz-Price earth-leakage type for polyphase alternating current circuits or apparatus.

In such arrangements core-balance current transformers or groups of line current transformers in earth-leakage formation, i. e. with their secondary windings connected in parallel, are provided at each end of the protected circuit or apparatus, hereinafter referred to as the protected section, (or on each circuit when the protected section has a number of circuits connected thereto) and the secondary windings of the core-balance transformers or the line current transformer groups at the two ends are connected in parallel with one another and with a tripping relay. Normally the current flowing into the section corresponds to that flowing out of the section and, moreover, the phase currents at each end are balanced. Thus not only is there no current flowing through the tripping relay but also there is no current flowing in the connections between the current transformer secondary windings, usually known as the residual current connections as, due to the phase balance, the secondary windings of the core-balance transformers are not energised or, in the case of line current transformer groups, the currents in the secondary windings in each group balance out. If, therefore, a fault should develop in any of the residual current connections, or in some instances, for example when core-balance current transformers are used, in the current transformer secondary windings, there is no indication thereof with the result that the protective gear fails to operate when a fault occurs in the protected section or, as is sometimes more serious, fails to remain stable when there is a fault outside the section, and the section is inadvertently cut out.

The object of the present invention is to provide an improved protective arrangement of the type referred to in which the above mentioned disadvantage is avoided.

The improved protective arrangement according to the present invention includes means for causing a testing current, during normal service, to flow in at least a part of the residual current circuit, and an alarm relay or other indicating device arranged to indicate when the normal flow of testing current is disturbed, whereby an indication can be obtained (without operation of the tripping relay or relays) as to the stability of the protective arrangement in the event of external faults or its response to internal faults.

The testing current may be caused to flow either continuously or intermittently through the current transformer secondary windings and the residual current connections between these windings, the arrangement being such that normally there is current balance and no testing current flows in a tripping and/or alarm relay circuit connected in parallel with the current transformer secondary windings.

If desired means may be provided for disturbing the balance of the testing currents to cause a testing current to flow in the tripping circuit whereby an indication may be obtained as to the response of the protective arrangement to internal faults.

The improved protective arrangement according to this invention is particularly suitable for the protection of an individual section of an alternating current network to which a number of external feeder or other circuits are connected, such, for example, as a busbar or busbar system, where it is particularly desirable, if not essential, that the protected section should not be inadvertently cut out by the straight-through fault current which flows in the section when there is an external fault. In this connection, it will be appreciated that the cutting-out of a busbar or other section to which a number of feeders is connected may cause extensive dislocation of the associated supply system, and it is most important that inadvertent cutting-out should be avoided, i. e. that the protective arrangement should be stable on external faults. Furthermore on a busbar section there are usually many more external faults, which are likely to endanger stability, than there are internal faults.

The use of a Merz-Price earth-leakage protective arrangement having residual current connections normally carrying no current could be avoided by using a complete Merz-Price interphase and earth-fault system in which current normally flows in the phase connections of the protective arrangement, which can be readily checked by, for example, connecting ammeters in series therewith. It is usually preferable, however, to employ only an earth-leakage arrangement for busbars and similar sections where the arrangement of the protected gear is such that any fault is likely to start as an earth fault. An earth-leakage arrangement is simpler, more economical and requires less space and wiring than a complete interphase system and furthermore it has the very important practical advantage that it is inherently more stable than the interphase system. Thus in an earth-leakage arrangement core-balance current transformers which are automatically completely balanced in respect of phase faults can be used. Alternatively, when line current transformers are employed, the several transformers in the phases of each feeder can be connected together close to their ends and it is relatively easy to obtain balance as the transformers in the group on each feeder need only be identical with respect to one another, whereas with an interphase system long interconnecting current-carrying leads are required and, on the occurrence of phase faults, balance must be maintained between all the current transformers associated with the protected section. It will be appreciated that interphase faults usually give rise to heavier fault currents than earth faults and that accordingly instability is more likely to occur on external interphase faults than external earth faults.

A convenient arrangement for an individual section of an alternating current network or portion of a network to which a number of external feeder or other circuits are connected, for example a busbar, comprises a group of current transformers in earth-leakage formation (or a core-balance current transformer) on each of the external feeder or other circuits, residual current connections for connecting the secondary windings of the current transformer groups (or the core-balance transformers) in parallel, a tripping relay connected across these residual current connections, an alarm relay or other indicating or warning device having a lower current setting than the tripping relay and connected in the tripping relay circuit, and means associated with the current transformer groups (or the core-balance transformers) for causing a testing current to flow either continuously or intermittently in the current transformer secondary windings and the residual current connections between them, the arrangement being such that normally there is balance of the testing current and no testing current flows in the connections to the tripping and alarm relays.

Conveniently each core-balance transformer or group of line current transformers is provided with an auxiliary winding energised from an alternating current source, the magnitude and direction of current flow and the number of turns in the auxiliary windings of the several transformers being such that normally testing current flows in the current transformer secondary windings and the residual current connections between them but no current flows through the tripping relay. The several auxiliary windings may be connected, preferably in series with one another, to a common source of alternating current, or each auxiliary winding may be energised from a current transformer in a phase of the associated feeder.

The indicating device may be connected in the circuit of the tripping relay and arranged to respond to a lower current than the tripping relay so as to indicate, as by operating an alarm, when testing current flows therein. Alternatively the indicating device may be associated with the auxiliary windings of the current transformers and arranged to indicate, as by operating an alarm, such disturbances of the normal impedance of the auxiliary windings as would be produced by a discontinuity in the residual current circuits.

When two portions of an alternating current network, for example two busbar sections, are provided with a section switch for connecting them together, the section switch having no current transformers, each section may have a protective arrangement as described above, and the residual current connections of the two arrangements may be connected in parallel by an auxiliary switch when the section switch is closed, means being provided for disturbing the testing current balance in the two protective arrangements by the same amount but in opposite senses whereby when the section switch is closed, testing current normally flows through the auxiliary switch but no testing current flows in the tripping and alarm relay circuits.

In the case of a duplicate busbar system having external feeder or other circuits capable of being connected at will to either busbar, and the known type of Merz-Price earth-leakage protective arrangement having a common buswire to which one end of the secondary winding of each core-balance transformer is connected, two individual buswires respectively corresponding to the two busbars, and auxiliary switches for connecting the other end of each current transformer secondary winding to the individual buswire corresponding to the busbar to which the associated feeder is connected, a two-coil differential relay may be provided having its coils connected in series between the two buswires associated with the auxiliary switches and a tripping and alarm relay circuit connected between the mid-point of such differential relay and the common buswire whereby normally testing current flows through the current transformer secondary windings, the buswires and the auxiliary switches but not through the tripping and alarm relay circuit, and in the event of a fault on one of the busbars the differential relay serves to determine which of the busbars is to be cut out by the tripping relay.

It will be appreciated that the arrangement described above for a duplicate busbar system having two separate busbars with or without a bus coupling switch for connecting them together, may, if desired, be employed with a system comprising two portions of an alternating current network, for example two busbar sections, which are provided with a section switch for connecting them together. When so used, however, it can be simplified somewhat as it will not usually be possible to transfer a feeder or other external circuit from one section to the other and thus auxiliary switches will not be required in the protective circuits. In other respects the arrangement may be similar to the duplicate busbar arrangement described above.

When each feeder is provided with a group of line current transformers in earth-leakage formation, the testing current may be derived from one of the line current transformers in each group, for example by an auxiliary separately excited winding on this current transformer or by a boosting transformer associated therewith or by using a current transformer having a turns ratio different from that of the other transformers in the group.

The presence of a fault in the tripping relay or the connections which would affect the ability of any of the above arrangements to operate in the event of an internal fault, may be checked by providing means, such as a switch, to cut out one or more of the auxiliary windings or to change the number of turns or the direction of current flow in one of such windings or otherwise to disturb the testing current balance so as to cause testing current to flow through the tripping and alarm relays.

In a duplicate busbar system having, instead of a core-balance current transformer, a group of line current transformers in earth-leakage formation in each feeder, a testing current may be caused to flow in that part of each set of residual circuit connections comprising the connection from a current transformer group to the auxiliary switch or a part of this connection, the switch itself and the connection from the closed contact of the switch to the individual buswire associated therewith, and means may be provided whereby an alarm or indication is given in the event of variations in the testing current due to a fault in any of these connections or in the switch itself. Preferably an auxiliary transformer has its primary winding connected in series with the secondary winding of one of the line current transformers in each group, the ends of its secondary winding respectively connected to the two individual buswires, and the mid-point of its secondary winding connected to the connection between the group of line current transformers and the auxiliary switch. Each auxiliary transformer may be provided with a tertiary winding connected to an alarm relay or other indicating or warning device preferably common to all the tertiary windings.

The alarm relay has been described as being arranged in the circuit of the tripping relay, that is to say either in series or in parallel therewith. Alternatively, however, where the testing current is produced by a number of auxiliary windings connected in series one on each core-balance transformer or group of line current transformers, the auxiliary windings may be connected in one arm of a Wheatstone bridge arrangement having an indicating device to indicate such change in the impedance of the said windings as would result from a discontinuity in the residual current connections.

Figure 2:
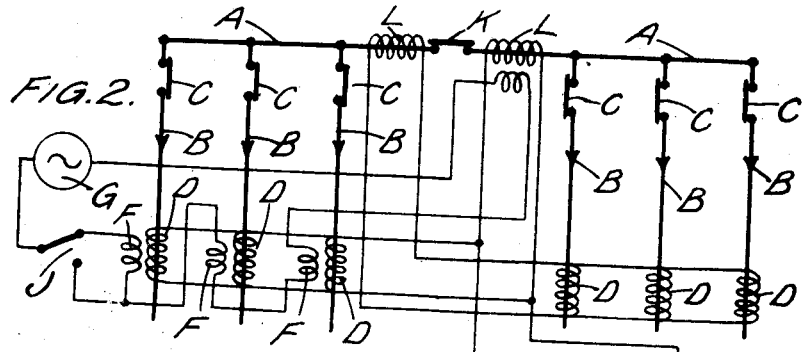
Figure 3:
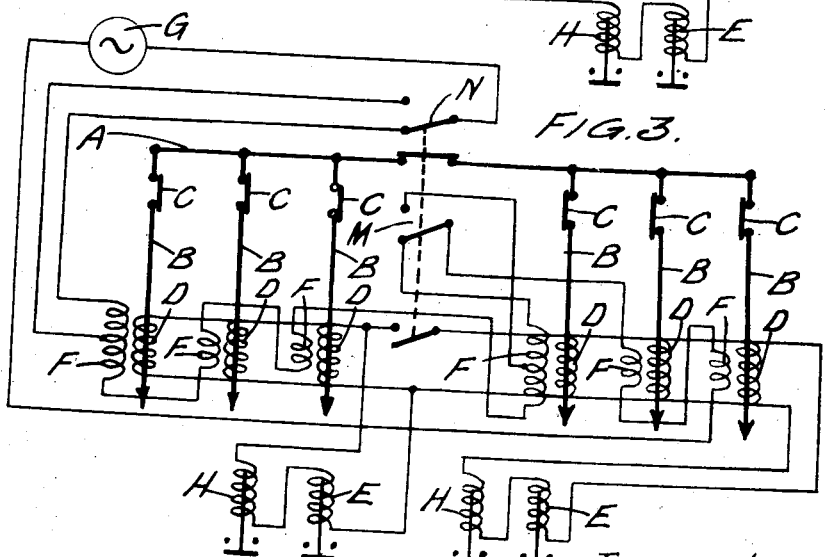
Figure 4:
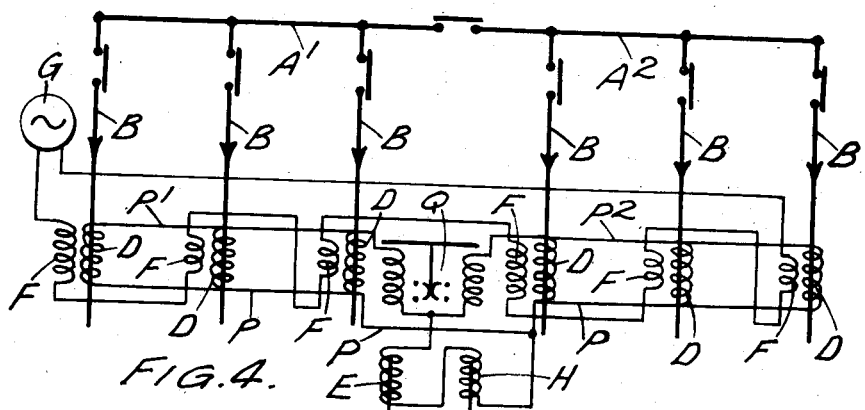
Figure 5:
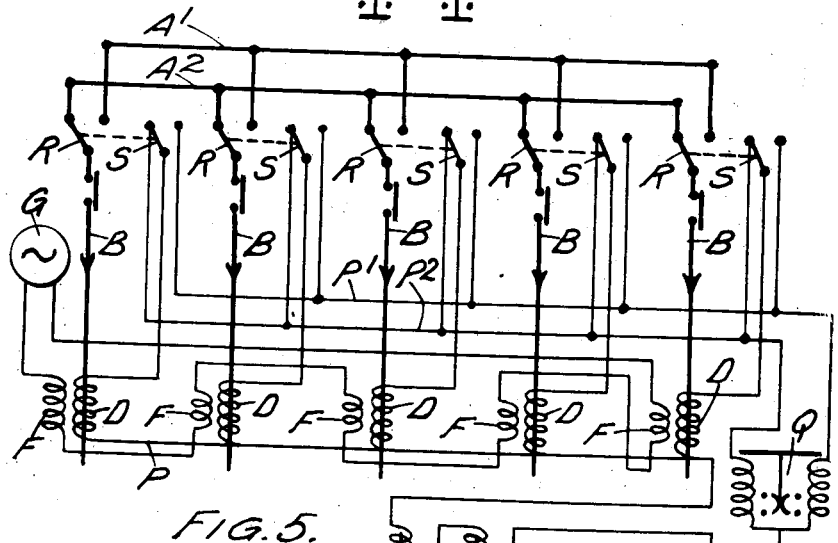
Figure 8:
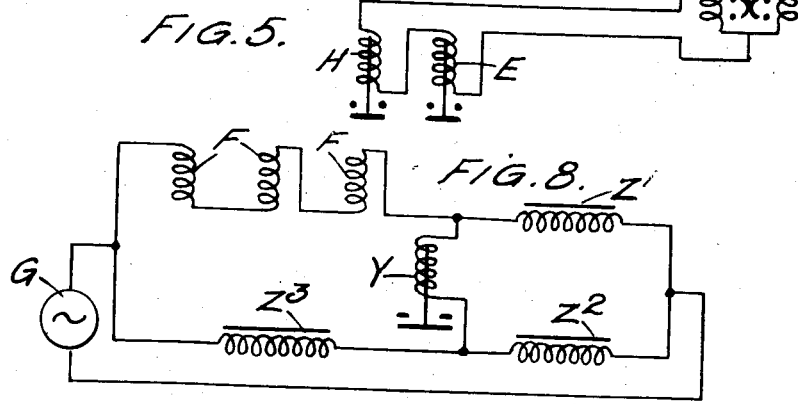
Figure 6:
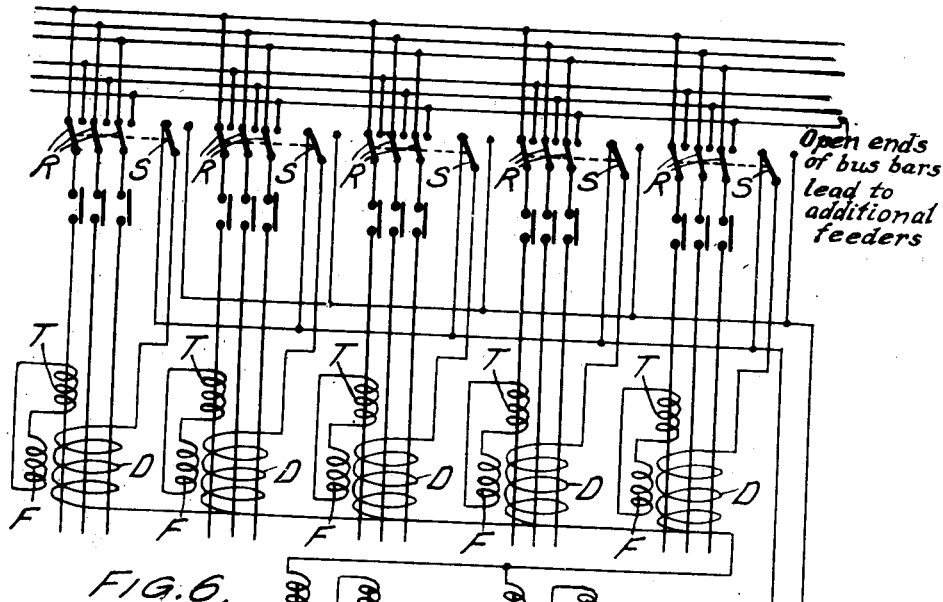
Figure 7:
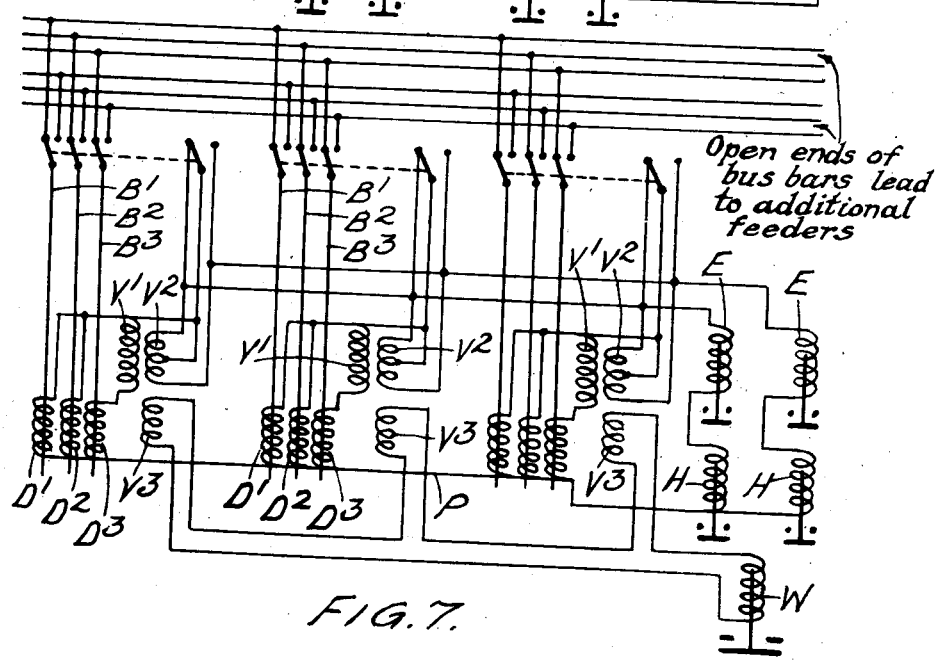
Figure 9:
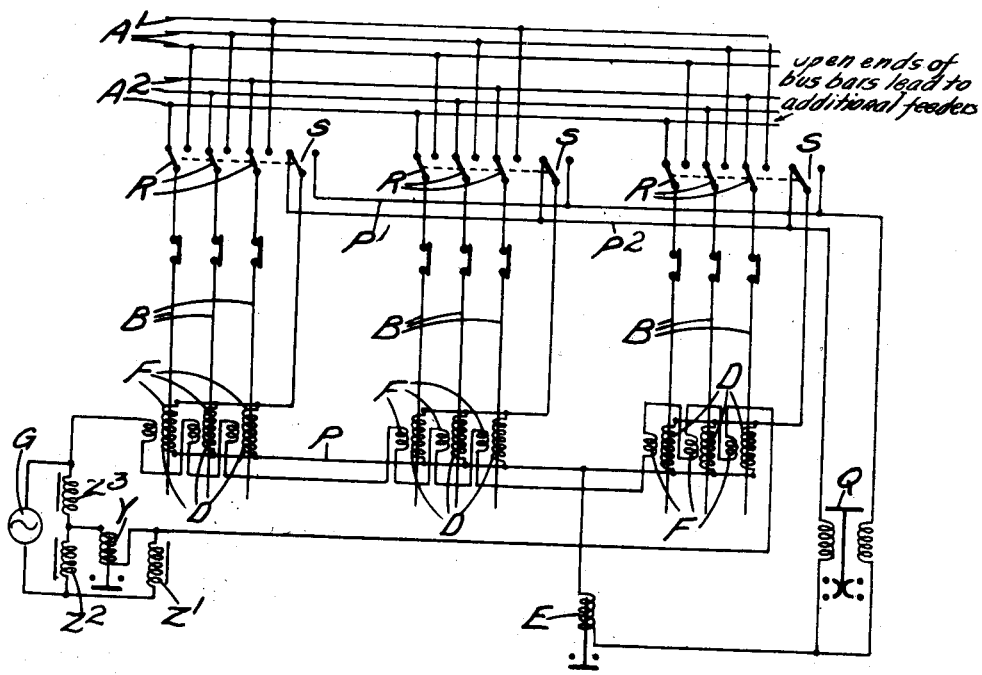

The invention may be carried into effect in various ways, but certain specific arrangements embodying it will now be described with reference to the accompanying circuit diagrams, in which Figure 1 shows an application of the invention to a simple busbar section, Figure 2 shows an application to a single busbar with a section switch, Figures 3 and 4 are arrangements similar to Figure 2 without current transformers on the section switch, Figures 5, 6 and 7 show various arrangements for duplicate busbars, and Figure 8 shows a modified arrangement of the alarm device, more completely shown in Fig. 9.

The invention is shown as applied to the protection of a system comprising a three-phase busbar A to which a number of feeder or other circuits B are connected by means of circuit-breakers C. Except in Figures 6 and 7 the three phases of the busbars, feeders and the like are represented by a single line for the sake of simplicity.

In accordance with known practice, Figure 1 shows the Merz-Price earth-leakage protective arrangement for the section as comprising a core-balance current transformer D on each feeder, the secondary windings of the several transformers being connected in parallel with one another to the coil of a tripping relay E. Under normal conditions the phase currents in each feeder are balanced, with the result that the secondary windings of the current transformers remain unenergised and there is no current flowing in the residual current connections of the protective gear, i. e. the connections between the several secondary windings and the connections to the tripping relay.

In the event of a straight-through earth fault current due to a fault outside the protected section, the tripping relay remains inoperative since, although there may be an out-of-balance current flowing out from the section in the faulty feeder, a corresponding current is flowing into the section through one or more of the other feeders. Thus there is current balance in the protective circuits and the tripping relay remains inoperative. It is to be noted that the stability of the protective gear depends upon the residual current connections between the current transformer secondary windings, and these windings themselves, being free from faults. The stability is not affected by a fault in the connections to the tripping relay or the relay itself.

In the event of an earth-fault in the protected section the earth-fault current flowing into the section exceeds that flowing out therefrom so that the balance in the protective circuit is disturbed and the tripping relay operates. In this case correct operation depends not only on the residual current connections between the transformer secondary windings and these windings themselves, but also on the freedom from fault of the tripping relay and the residual current connections thereto.

The known type of protective arrangement is, in accordance with the present invention, modified so as to permit the state of the various connections upon which statisfactory operation of the gear depends to be continuously or periodically tested or checked.

Accordingly each core-balance transformer is provided with an auxiliary winding F and the auxiliary windings of the transformers on the several feeders are connected in any suitable way, preferably in series, to a source of alternating current G. The energisation of the auxiliary winding of each transformer causes a current to flow in the transformer secondary winding. The auxiliary windings, which for convenience will hereinafter be referred to as the testing windings, of the several transformers have their numbers of turns so selected and are so connected with respect to one another that there is current balance in all the parallel-connected secondary windings, considered together, but the magnitudes and/or numbers or direction of turns of the currents flowing in the various windings differ from one another in such a manner that normally a testing current flows in the residual current connections between the secondary windings and in the windings themselves. Owing, however, to the current balance no testing current flows through the tripping relay or the residual current connections thereto. For example, where, as shown in Figure 1, three feeders are connected to the busbar, the testing winding of the core-balance transformer of one feeder (that on the left) may have twice as many turns as the testing windings of the transformers on the other two feeders, the three testing windings being connected in series with one another in such directions that the current from the A. C. source flows through the larger winding in a direction opposite to the direction of current flow in the other two testing windings.

In the event of a fault in the residual current connections between the secondary windings or in these windings, the current balance is disturbed and an out-of-balance current flows in the connections of the tripping relay and through this relay. The testing windings and the source from which they are energised are, however, so chosen that the maximum out-of-balance testing current likely to flow as the result of a fault in the protective gear will be insufficient to operate the tripping relay, and in order to detect the presence of an out-of-balance testing current, an ammeter or alarm relay H or any other suitable warning or indicating device is connected in series with the tripping relay and is given a setting such that it will respond when only a small out-of-balance current flows.

As there is no out-of-balance testing current flowing in the relay circuit when the current transformer secondary windings and the residual current connections between them are healthy, the testing current can be applied continuously without altering the normal balanced condition of the arrangement or affecting its operation when there is a fault on the protected section or on the power system associated therewith. The alarm relay or other indicating device will however be operated at once should a fault develop in the protective gear which will affect its stability in the event of external faults.

Since, as stated above, there is normally no current flowing in the tripping or alarm relays or in the residual current connections thereto, this part of the protective gear is not continuously tested as is the part thereof on which the stability to external faults depends. These untested parts of the protective circuits are however only called upon to carry current when there is a fault in the protected section and, in the case of a busbar protective system, it is not so important for such connections to be continuously or frequently checked as it is to check those connections of the protective arrangement which, if faulty, will affect the stability of the gear.

Periodic checking of the tripping relay and its connections can however readily be effected in the arrangement of Figure 1 by providing means for disturbing the normal testing current balance so that an out-of-balance testing current flows in the residual current connections to the tripping relay and, provided these connections and the relay are healthy, causes operation of the alarm relay. Conveniently disturbance of the normal current balance is effected by a switch J arranged when operated to modify the connections of the testing windings in such a manner that one of these windings is cut out or its effective number of turns altered.

Preferably the switch is arranged so that normally the testing current is applied continuously to check or supervise the stability of the gear to external faults but can be operated periodically to check the ability of the gear to trip on an internal fault. If desired, however, both the stability and tripping tests can be carried out intermittently, a switch having an "off" and two "on" positions being arranged so to control the connections of the testing windings that in one "on" position the stability of the system to external faults is tested and in the other "on" position its response to internal faults is tested.

When two single busbar sections each having feeders and connected by a section switch, are to be protected by a Merz-Price earth-leakage system having core-balance transformers, the arrangement of protective circuits and the associated testing connections depends mainly upon whether or not current transformers are provided for the section switch.

Figure 2 shows an arrangement in which two busbar sections A are interconnected by means of a section switch K provided with current transformers L. In this event the two busbar sections are provided with entirely separate protective arrangements each similar to that shown in Figure 1, the secondary windings of the current transformers on the two sides of the section switch being respectively connected in the two Merz-Price circuits so that the section switch is overlapped. In other words, each section of the busbar ranks as an external circuit as regards the protective arrangement of the companion section. Each current transformer L is provided with a testing winding (of which only one is shown in the drawings) and the testing windings for each system are arranged and connected in a manner similar to that of Figure 1.

Figure 3 shows an arrangement in which the section switch is not provided with current transformers, as is frequently the case owing to practical difficulties in mounting such transformers. In these circumstances it is necessary so to arrange the protection and testing circuits that the protective gear will operate and can be tested as a whole when the section switch is closed but can function as two separate protective gears when the section switch is open.

As in the arrangement of Figures 1 and 2, the secondary windings of the core-balance current transformers of the feeders on each busbar section are connected in parallel with one another and to tripping and alarm relays. A testing winding is provided on each current transformer and the testing windings of the current transformers on both sections are connected in series with one another to a common alternating current source, the testing windings in each section being so dimensioned and connected with respect to one another that normally there is balance of the testing current in the residual current connections of each of the two sections. When the section switch is open the two protective systems operate independently of one another to protect the two busbar sections, a testing current flowing continuously in each section so that the appropriate alarm relay operates in the event of a fault in the protective gear to which the relay is connected.

The section switch, when closed, also closes an auxiliary switch which connects together the residual current connections of the two sections so that the secondary windings on all the current transformers are connected in parallel with one another and thus the balanced protection extends over all the feeders connected to both busbar sections. The connections of the testing windings may be left unaltered, in which case the current transformers of each section would still be balanced in so far as the testing current is concerned but no testing current would flow through the auxiliary switch between the two sections of the residual current wiring. This is a disadvantage in practice as the auxiliary switch constitutes one of the weakest links in the residual current connections and there would be no indication in the event of its failure. Accordingly two further auxiliary switches M and N are preferably provided and are respectively associated with testing windings of current transformers in the two sections so that, when these switches are operated by closing of the section switch, the effective numbers of turns in the testing windings of two current transformers (one in each section) are altered. The alterations in the testing windings are such that, under normal conditions, the current unbalance produced in the residual current connections of one section is equal and opposite to that produced in the residual current connections in the other section. An equalising current thus flows through the auxiliary switch but the circuit as a whole remains balanced and the alarm relays do not operate. In the event of failure of the auxiliary switch the unbalance in each section cannot be counteracted by that in the other section so both alarm relays will be operated.

As the tripping relays are connected in parallel when the auxiliary switch is closed, it is desirable to provide means whereby a fault on one of the busbar sections does not cause cutting-out of both sections. Accordingly the tripping relays—which operate simultaneously in the event of an internal fault—are so arranged as to trip the section switch instantaneously. As soon as this switch is open, the auxiliary switches are opened, the tripping relay on the healthy section resets whilst the tripping relay on the faulty section remains operative and after a short time-lag operates its associated circuit-breakers to isolate the section.

Figure 4 shows an alternative arrangement applicable to the protection of two busbar sections $A^1$ and $A^2$, whether or not they are arranged to be connected by a section switch K.

One end of each of the secondary windings of all the current transformers is connected to a common buswire P whilst at their other end those of the section $A^1$ are connected to a buswire $P^1$ and those of the section $A^2$ to a buswire $P^2$.

A differential two-coil relay is arranged with its two coils connected in series between the buswires $P^1$ and $P^2$ whilst a single alarm and tripping relay circuit including a tripping relay E and alarm relay H is connected between the mid-point of the differential relay and the buswire P.

The testing windings are connected and arranged in a similar manner to that described above in connection with the more simple arrangements. Thus for example if there are six feeders in all connected to the two busbar sections the testing windings on the current transformers may all have the same number of turns so that the testing current balances in the residual current connections considered as a whole irrespective of the splitting up of these connections into two parts due to the several feeders being connected to different busbars. Thus the testing current will not balance in the buswires $P^1$ and $P^2$ considered separately and an equalising current will flow through the differential relay Q. This relay however will not respond (being of the balanced type) and, as the testing currents balance as a whole, there will be no current flowing from the mid-point connection through the alarm and tripping relays to the common buswire. Thus the testing current can be continuously applied to the protective circuit without affecting its normal operation or stability. In the event of a fault in any part of the residual current wiring or in the current transformer secondary windings this balance will be disturbed and a current will flow from the mid-point of the differential relay through the tripping and alarm relays to the common buswire.

As in the other arrangements the out-of-balance testing current which can flow due to a fault on the protective gear is made less than that required to operate the tripping and differential relays. In the case of Figure 4 it is to be noted that the out-of-balance current which flows in the residual current wiring during a fault on the protected section flows through one coil of the differential relay which will operate to discriminate between which of the busbar sections is to be cut out.

In the arrangement of Figure 4 it is assumed that there will be no provision for connecting a feeder alternatively to either of two busbar sections. Where such provision is made, as in the case of a duplicate busbar system, a similar arrangement modified as shown in Figure 5 may be employed. Thus the system may have, for example, main and auxiliary busbars $A^1$ and $A^2$ whilst the protective gear is provided with three buswires P, $P^1$ and $P^2$ one of which is common whilst the other two respectively correspond to the two busbars and will for convenience be referred to as main and auxiliary buswires. Each feeder is provided with a busbar selector switch R or the equivalent for connecting it to one or other of the busbars, and a core-balance current transformer having its secondary winding connected between the common buswire P and an auxiliary switch S so controlled by the busbar selector switch that the secondary winding is connected through the auxiliary switch to the buswire corresponding to the busbar to which the feeder is connected. In order to check the protective gear in accordance with the present invention, the current transformers are, as in the arrangements described above, provided with testing windings energised from a suitable source.

Whilst the protective and testing circuits can be completed by connecting tripping and alarm relays in series with one another between the common buswire and each of the other two buswires, this arrangement is not very practicable as it would require somewhat elaborate tapping and other switches for controlling the connections of the testing windings of the several transformers in accordance with the allocation of the feeders between the two busbars. Thus although the number of feeders associated with both busbars at any one time may remain the same, the way in which this number of feeders is distributed between the two busbars varies and it would be necessary to make corresponding variations in the arrangement of the testing windings if testing current balance is to be maintained in each set of residual current connections for every possible distribution of the feeders between the two busbars.

This difficulty is overcome by connecting the main and auxiliary buswires to the ends of a differential relay Q having its mid-point connected to the alarm and tripping relays as in Figure 4.

The operation is similar to that of the arrangement shown in Figure 4. Thus although a testing current may circulate through the differential relay and will vary in accordance with the number of feeders connected to each busbar, this current will not operate the relay since the latter is balanced and no current will flow in the alarm and tripping circuit.

Figure 6 shows a modified arrangement in which the balance of testing current in each buswire in spite of changes in the distribution of the feeders is ensured by energising the testing winding of each core-balance current transformer from a line current transformer in a phase of the associated feeder so that the current carried by the testing windings depends on that carried by the feeder. Thus, Figure 6 shows each testing winding F connected to a current transformer T in one phase of the associated feeder. This method of energising the testing windings (which may if desired be used with any of the arrangements described above) has the practical disadvantage that the current transformers on the different feeder circuits connected to the busbars may have different ratios and accordingly difficulties may arise in obtaining balance of the testing current and hence the arrangement of Figure 5 may in general be preferable.

The improved testing arrangements according to this invention can also be applied to Merz-Price earth-leakage protective arrangements employing line current transformers connected in earth-leakage formation, i. e. in parallel with one another. Thus, for example, in such arrangements a testing winding may be added to all or some of the line current transformers but usually it will be sufficient to add such a winding to only one line current transformer in each three-phase group. Thus, for example, the current transformer in a particular phase in each feeder may be provided with a testing winding, the several testing windings being connected and energised in the same manner as in the case of the core-balance current transformers described above. Alternatively one line current transformer in each group may have a boosting transformer associated therewith, for example as shown in Figure 6 in connection with a core-balance transformer, or alternatively with its secondary winding directly in series with that of one of the line current transformers. Again one of the line current transformers may have a turns ratio different from the turns ratios of the other transformer in the group. It will readily be appreciated, without further description, that in such an arrangement an alarm relay connected in the residual current connections in series with the tripping relay will be operated should an out-of-balance testing current flow in the residual current connections due to a fault in these connections or in the secondary windings of any of the current transformers.

When line current transformers are used, instead of core-balance current transformers, in a Merz-Price earth-leakage protective arrangement for a duplicate busbar system, a modified arrangement can be employed for the testing of the auxiliary switches controlling the connection of the line current transformer secondary groups to the main and auxiliary buswires, it being particularly desirable to test these auxiliary switches as they are probably the part of the protective gear which is most likely to become faulty. Accordingly a testing or checking current is caused to flow continuously or intermittently through each auxiliary switch.

Figure 7 shows such a modified arrangement in which the conductors $B^1$ $B^2$ and $B^3$ of each feeder are provided with line current transformers $D^1$ $D^2$ and $D^3$ which are star-connected in the usual way, the star points being connected to the common buswire P whilst the other ends of the three current transformer windings are connected together and to the auxiliary switch for connecting the residual current connection from the current transformers to either the main or auxiliary buswire in accordance with the busbar to which the feeder is connected. The testing current for the auxiliary switch is conveniently derived from an auxiliary transformer having its primary winding $V^1$ connected in series with the secondary winding of one of the line current transformers and the ends of its secondary winding $V^2$ respectively connected to the main and auxiliary buswires. The mid-point of the secondary winding of the auxiliary transformer is connected to the residual current connection between the current transformer windings and the auxiliary switch. The auxiliary transformer is provided with a third or tertiary winding $V^3$ connected in series with the corresponding windings of other feeders to an alarm relay W.

Under normal conditions the load current flowing in the secondary windings of one of the line current transformers flows through the primary winding of the auxiliary transformer, thereby inducing an E. M. F. in the secondary winding of this transformer. Assuming that the main buswire contact of the auxiliary switch is closed, the current flows from one end of the auxiliary transformer secondary winding to the main buswire and then through the auxiliary switch and the residual current connection to the mid-point of the secondary winding of the auxiliary transformer. This half of the secondary winding is thus substantially short-circuited by the auxiliary switch. The other half of the secondary winding, which is connected to the auxiliary buswire, is open-circuited as the other contact of the auxiliary switch is open. The short circuit on one half of the secondary winding of the auxiliary transformer reduces the flux flowing in the core of this transformer to a negligible value so that the tertiary winding connected to the alarm relay is not appreciably energized. Should the auxiliary switch be faulty, the short-circuit current is reduced or no longer flows and the consequent magnetic flux in the core of the auxiliary transformer excites the tertiary winding, thereby operating the alarm relay or other warning device to indicate the faulty switch.

When an indication of the existence of faults in the other parts of the residual current connections is required, an alarm relay connected in series with the tripping relay between the common buswire and each of the other buswires may be relied upon. These alarm relays should have lower current settings than the tripping relays so that any out-of-balance current flowing in the residual current connections during normal conditions due to a fault in the protective gear will cause an alarm relay to operate but will be insufficient to cause operation of the tripping relay. These alarm relays would not however operate in the event of failure of the auxiliary switches or in the event of a break in the connections thereto, and thus cannot be used alone to provide a complete test of the protective circuits.

In the arrangements described the alarm relay or other device for indicating if the balance of currents in the secondary windings of the transformers has been disturbed, is shown connected in series with these windings. It will, however, be appreciated that other arrangements may be employed. For example, the change of impedance of the testing winding consequent upon a discontinuity in the corresponding secondary winding may be arranged to operate an alarm. Thus, a normally energised relay may be connected in series with the testing windings F. Whilst current can circulate in the secondary windings of the testing transformers, the impedance of the testing windings F will be low and the relay will be maintained in its energised position, but if a discontinuity occurs in one of the residual current connections or the secondary winding of one of the transformers, the increased impedance of the testing windings will cause the relay to be released and give an alarm.

In order to avoid the use of a relay which is normally energised, the arrangement shown in Figure 8 may be employed.

Thus, Figure 8 shows a modification which may be applied to any of the arrangements of Figures 1 to 7 in which the testing windings F constitute one arm of a Wheatstone bridge arrangement having impedances $Z^1$, $Z^2$ and $Z^3$ to constitute the other two arms. The supply of testing current G is connected to one pair of opposite corners of the bridge whilst an alarm relay Y is connected to the other pair of opposite corners.

In normal operation the bridge is balanced and the alarm relay Y released, but in the event of the impedance of the testing windings F being increased by a discontinuity in the residual current circuit, the balance of the bridge will be disturbed and the alarm Y will be energised.

If desired any of the arrangements described above may, as in the first arrangement, be provided with a switch or other means for disturbing the normal balance of the testing current flowing in the residual current connections between the current transformer secondary windings so that testing current is caused to flow through the tripping and alarm relays, thereby checking the condition of these relays and the connections thereto and thus the ability of the protective gear to operate in the event of a fault on the protected section.

It will be appreciated that the above description is by way of example only and that various modifications may be made within the scope of the invention. Thus, for example, the testing current may be caused to flow continuously through the circuits under test as in the arrangements described above or intermittently under the control of an operator or any suitable form of timing mechanism arranged so that testing is effected at predetermined intervals.

What I claim as my invention and desire to secure by Letters Patent is:

1. Apparatus for testing an earth leakage protective arrangement of a protected section comprising current transformer means on each line emanating from the protected section, residual current connections connecting the secondaries of the said transformers in parallel to carry current in the event of an earth fault, a tripping relay operated by lack of balance of such residual currents, indicating means responsive to lack of balance of such currents of a value insufficient to operate the tripping relay, means for producing testing currents in the current transformer means of such magnitude and direction as to balance out so that normally no current flows through the indication means, but to operate the said indicating means but not the tripping relay in the event of a fault in the current transformer means or the residual current connections even in the absence of any earth fault current.

2. Apparatus for testing an earth leakage protective arrangement for a portion of an alternating current network to which a number of external circuits are connected, comprising current transformer means on each circuit emanating from the protected portion, residual current connections connecting the secondaries of the said current transformer means in parallel to carry current in the event of an earth fault, a tripping current relay operated by lack of balance of such residual currents, indicating means responsive to lack of balance of such currents of a value insufficient to operate the tripping relay, an auxiliary winding for each current transformer means, means for supplying alternating current to such auxiliary windings to produce in the current transformer secondary windings and the residual current connections testing currents which are normally balanced so that no current flows through the indicating means but are sufficient to operate the said indicating means but not the tripping relay in the event of lack of balance due to a fault in the current transformer means or the residual current connections even in the absence of any earth fault current.

3. Apparatus for testing an earth leakage protective arrangement of a protected portion of an alternating current network to which a number of external circuits are connected comprising current transformer means on each circuit emanating from the protected portion, residual current connections connecting the secondaries of the said transformers in parallel to carry current in the event of an earth fault, a tripping relay operated by lack of balance of such currents, an auxiliary winding for each current transformer means, means for supplying alternating current to such auxiliary windings, and indicating means responsive to changes of impedance of the auxiliary windings to indicate a discontinuity in the residual current circuits or the said transformer means even in the absence of any earth fault current.

4. Apparatus for testing an earth leakage protective arrangement of a protected portion of an alternating current network to which a number of external circuits are connected comprising current transformer means on each circuit emanating from the protected portion, residual current connections connecting the secondaries of the said transformers in parallel to carry current in the event of an earth fault, a tripping relay operated by lack of balance of such currents, indicating means responsive to lack of balance of such currents of a value insufficient to operate the tripping relay, an auxiliary winding for each current transformer means, means connecting the said auxiliary windings in series, means for supplying alternating current to such auxiliary windings to produce in the current transformer secondary windings and the residual current connections testing currents which are normally balanced so that no current flows through the indicating means but are sufficient to operate the said indicating means, but not the tripping relay in the event of lack of balance due to a fault in the current transformer means or residual current connections even in the absence of any earth fault current.

5. Apparatus for testing an earth leakage protective arrangement of an individual protected section of an alternating current network to which a number of external circuits are connected comprising current transformer means on each circuit emanating from the protected section, residual current connections connecting the secondaries in parallel to carry current in the event of an earth fault, a tripping relay operated by lack of balance of such residual currents, indicating means responsive to lack of balance of such currents of a value insufficient to operate the tripping relay, an auxiliary winding for each current transformer means, a current transformer in a phase of each external circuit for energizing the corresponding auxiliary winding to produce in the current transformer secondary windings and the residual current connections testing currents which are normally balanced so that no current flows through the indicating means but are sufficient to operate the said indicating means but not the tripping relay in the event of lack of balance due to a fault in the current transformer means or residual current connections even in the absence of any earth fault current.

6. Apparatus for testing an earth leakage protective arrangement of an alternating current duplicate busbar system having external circuits and switching means for connecting at will the said external circuits to either busbar, comprising current transformer means on each circuit emanating from the protected section, residual current connections connecting the secondaries of the said transformers in parallel to carry current in the event of an earth fault comprising a common buswire to which one end of each of the secondary windings of the said transformer means is connected and two individual buswires respectively corresponding to the two busbars, auxiliary switches for connecting the other end of each current transformer secondary winding to the buswire corresponding to the busbar to which the associated external circuit is connected, a two-coil differential relay having its coils connected in series between the two individual buswires, a tripping relay operated by lack of balance of the residual currents, indicating means responsive to lack of balance of such currents of a value insufficient to operate the tripping relay, means for producing in the current transformer secondary windings and residual current connections testing currents which are normally balanced so that no current flows through the indicating means but are sufficient to operate the said indicating means but not the tripping relay in the event of lack of balance due to a fault in the current transformer means or the residual current connections even in the absence of any earth fault current.

7. Apparatus for testing an earth leakage protective arrangement for a protected portion of an alternating current network to which a number of external circuits are connected comprising a group of line current transformers in earth leakage formation on each line emanating from the protected section, residual current connections connecting the secondaries of the said transformer groups in parallel to carry current in the event of an earth fault, a tripping relay operated by lack of balance of such residual currents, indicating means responsive to lack of balance of such currents of a value insufficient to operate the tripping relay, means including a boosting transformer associated with each current transformer group for producing in the residual connections between the current transformer groups testing currents which are normally balanced so that no current flows through the indicating means but are sufficient to operate the said indicating means but not the tripping relay in the event of lack of balance due to a fault in the current transformers or the residual current connections even in the absence of any earth fault current.

8. Apparatus for testing an earth leakage protective arrangement for a protected portion of an alternating current network to which a number of external circuits are connected comprising a group of line current transformers in earth leakage formation on each of the external circuits, residual current connections connecting the secondary windings of the said current transformer groups in parallel to carry current in the event of an earth fault, a tripping relay operated by lack of balance of such residual currents, indicating means responsive to lack of balance of such currents of a value insufficient to operate the tripping relay, the turns ratios of the line current transformers in a group differing in such a manner as to produce in the current transformer secondary windings and the residual current connections between the transformer groups testing currents which are normally balanced so that no current flows through the indicating means but are sufficient to operate the said indicating means but not the tripping relay in the event of lack of balance due to a fault in the current transformer means or the residual current connections even in the absence of any earth fault current.

9. Apparatus for testing an earth leakage protective arrangement for a protected portion of an alternating current network to which a number of external circuits are connected comprising current transformer means on each circuit emanating from the protected portion, residual current connections connecting the secondaries in parallel to carry current in the event of an earth fault, a tripping relay operated by lack of balance of such residual currents, indicating means responsive to lack of balance of such currents of a value insufficient to operate the tripping relay, an auxiliary winding for each current transformer means, means for supplying alternating current to such auxiliary windings, the direction of current flow in and the number of turns of the auxiliary windings of the current transformer means being such that normally a testing current circulates through the current transformer secondary windings and the residual current connections between them but no current flows through the tripping relay and the indicating device, but a testing current will flow through the latter to operate the said indicating means but not the tripping relay in the event of lack of balance due to a fault in the current transformer means or residual current connections even in the absence of any earth fault current, and means to change the effective number of turns of at least one of the auxiliary windings to disturb the balance of the testing current to operate the said indicating means but not the tripping relay to indicate the response of the protective arrangement to internal faults.

10. Apparatus for testing an earth leakage protective arrangement for a protected portion of an alternating current network to which a number of external circuits are connected comprising current transformer means on each circuit emanating from the protected section, residual current connections connecting the secondaries in parallel to carry current in the event of an earth fault, a tripping relay operated by lack of balance of such residual currents, an auxiliary winding for each current transformer means, means constituting a Wheatstone bridge arrangement of impedances having the auxiliary windings as one arm, the direction of current flow in and the number of turns of the auxiliary windings of the several transformer units being such that normally a testing current circulates through the current transformer secondary windings and the residual current connections between them, but normally no current flows through the tripping relay, and indicating means arranged to indicate disturbances of the bridge balance by a change of impedance of the said windings resulting from a fault in the current transformer means or the residual current connections even in the absence of any earth fault current.

HENRY LEYBURN.